UNITED STATES PATENT OFFICE.

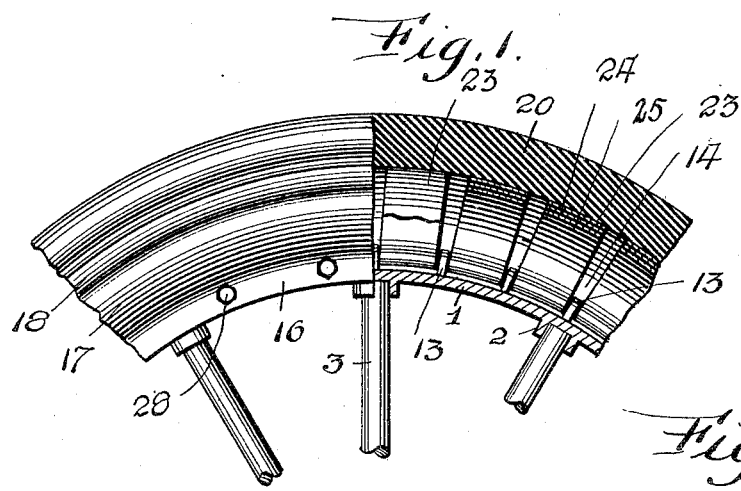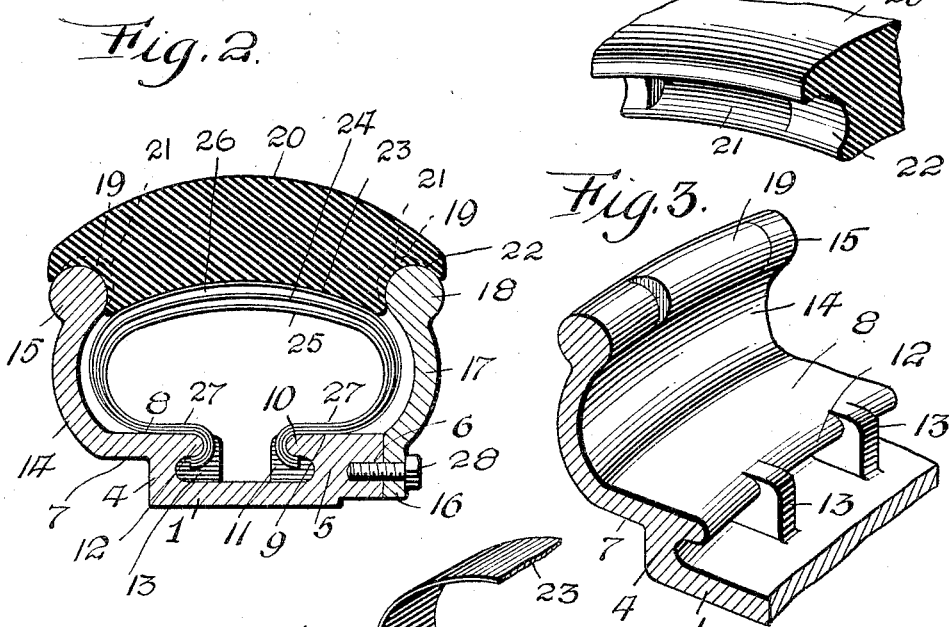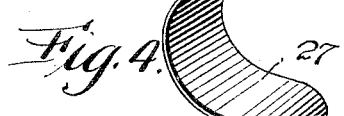

DEXTER J. THAYER, OF PITTSBURGH, PENNSYLVANIA.

CUSHION-TIRE.

1,051,465.     Specification of Letters Patent.     Patented Jan. 28, 1913.

Application filed May 10, 1912. Serial No. 696,359.

*To all whom it may concern:*

Be it known that I, DEXTER J. THAYER, a citizen of the United States of America, residing at Pittsburgh, in the county of Allegheny and State of Pennsylvania, have invented certain new and useful Improvements in Cushion-Tires, of which the following is a specification, reference being had therein to the accompanying drawing.

This invention relates to cushion tires and has for its object to provide in the manner as hereinafter set forth a solid rubber tired wheel, more especially designed for motor vehicles, possessing the resilient qualities of pneumatic tires without being subject to injury by punctures.

Further objects of the invention are to provide a cushion tire which is comparatively simple in its construction and arrangement, strong, durable, possessing the necessary resiliency to absorb shock, efficient in its use, readily assembled, conveniently repaired when occasion so requires and comparatively inexpensive to manufacture.

With the foregoing and other objects in view the invention consists of a novel construction, combination and arrangement of parts as hereinafter more specifically described and illustrated in the accompanying drawing, wherein is shown an embodiment of the invention, but it is to be understood that changes, variations and modifications can be resorted to which come within the scope of the claim hereunto appended.

In describing the invention in detail, reference is had to the accompanying drawing wherein like reference characters denote corresponding parts throughout the several views and in which:—

Figure 1 is a longitudinal sectional view, broken away, of a tire constructed in accordance with this invention. Fig. 2 is a transverse section of the tire. Fig. 3 is a perspective view, broken away, of a portion of the rim. Fig. 4 is a detail illustrating one half of a cushioning spring, and Fig. 5 is a perspective view, broken away, of the resilient tread member.

Referring to the drawings in detail a cushion tire constructed in accordance with this invention includes a channel shaped rim preferably constructed of metal and comprising an annular body portion 1 formed with inwardly extending sockets 2 for the outer ends of the spokes 3. The body portion 1 at each side thereof is formed with an upwardly extending flange, these flanges being indicated at 4, 5, the flange 5 being of greater thickness laterally of the body 1 than the flange 4 and provided with threaded sockets 6 for a purpose to be presently referred to. Formed integral with the outer terminus of the flange 4 is an annular band 7 which projects inwardly and outwardly with respect to said flange 4 and which provides a bearing surface 8 for a purpose to be presently referred to. The thickness of the flange 5 is such as to provide a bearing surface 9 for a purpose to be presently referred to and said flange 5 is cut away so as to form inwardly extending ribs 10 separated by spacing members 11. The inwardly projecting portion of the band 7 forms a series of ribs 12 which are separated by spacing members 13 integral with the body portion 1 and the flange 4.

Formed integral with the outer terminus of the band 7 is an annular curved side piece 14 which has its outer terminus merged into a cylindrical bead 15. The face of the flange 5 provided with the threaded sockets 6 is flat and abutting against said flat face is a ring 16 having projecting therefrom an annular curved side piece 17 which terminates in a cylindrical bead 18. The curvature of the side piece 17 is opposite with respect to the curvature of said piece 14. Each of the beads 15 and 18 has projecting from the inner portion of its periphery spaced semi-cylindrical and longitudinally extending lugs 19 for a purpose to be presently referred to.

Mounted between the beads 15 and 18 as well as straddling the side pieces is a solid resilient annular tread piece 20 having each side thereof conforming to the contour of the bead and further having each side formed with spaced sockets 21 for the reception of the lugs 19, these latter preventing the tread piece from creeping circumferentially with respect to the rim. The conforming of the sides of the tread piece 20 to the shape of the beads 15 and 18 as at 22 forms what may be termed elongated pockets for the reception of the beads so that the tread piece 20 will be maintained in position between the side pieces 14 and 17 at the outer termini thereof. The inner as well as the outer face of the tread piece 20 is upon an arc of a circle.

Arranged within the rim is a circumferentially extending series of sets of cushioning elements, each set consisting of a plurality of springs, as shown by way of example three in number, and the springs of each set extend transversely with respect to the rim. The springs of each set are indicated by the reference characters 23, 24, and 25. The spring 23 incloses the spring 24 and the latter incloses the spring 25. The springs are each substantially bow shaped in contour and separated from each other, as indicated at 26. The springs of each set are so bent as to provide a laterally extending portion, the said portions abutting against each other as indicated at 27 and these laterally extending portions of the spring 23 are seated upon the bearing faces 8 and 9. The inner end of the springs of each set are bent around the ribs 10 and 12 as clearly shown in Fig. 2, the bent ends being positioned between the spacing members 11 and 13. The members 11 and 13 not only constitute spacing means for the sets of springs, but also act to prevent the circumferential shifting of one set with respect to the other. The ribs 10 and 12 are of a length substantially equal to the width of a spring at the inner end thereof.

The ring 16 is detachably secured to the flange 5 by screws 28 which extend through the ring 16 and engage in the threaded sockets 6.

The spring 23 acts as a means to cushion the tread piece 20 and when pressure is applied to the latter and overcomes the tension of the spring 23, the latter is forced inwardly against the spring 24 which then assists the spring 23 in cushioning the tread; if the pressure should overcome the springs 23, 24, the spring 24 is forced against the spring 25 and the latter assists the springs 23 and 24 for cushioning purposes. By such construction and arrangement the spring 24 is used to reinforce the spring 23 and the spring 25 to reinforce the spring 24; under such conditions the springs 24 and 25 reinforce the springs 23. The sets of cushioning elements maintain the tread piece 20 outwardly with respect to the rim and are utilized not only to absorb shock when the wheel travels over uneven surfaces or meets with an obstruction, but also constitute means for cushioning the tread piece and perform the function of a pneumatic tube. Owing to the manner in which the springs are constructed, so that their ends will tend to move apart it is obvious that this action will bind the curved ends of the springs against the ribs 10 and 12.

What I claim is:—

A tire comprising a channel-shaped rim having a body portion provided with ribs projecting inwardly from opposite walls of the body portion and having spacing members located in the channel of the body portion and projecting beyond said ribs, an annular curved side piece integral with and constituting one side of the rim, a detachable side piece constituting the other side of the rim, each side piece having a bead on its outer edge and each bead having spaced lugs on the inner face of its periphery, a tread piece fitting at its sides on said beads and having pockets to receive said lugs, and a series of superposed cushioning springs mounted in the rim beneath the tread piece, the ends of said springs being received beneath the inwardly projecting ribs of the rim.

In testimony whereof I affix my signature in the presence of two witnesses.

DEXTER J. THAYER.

Witnesses:
MAX H. SROLOVITZ,
J. P. APPLEMAN.

---

Copies of this patent may be obtained for five cents each, by addressing the "Commissioner of Patents, Washington, D. C."